United States Patent
Song et al.

(10) Patent No.: US 9,665,399 B2
(45) Date of Patent: May 30, 2017

(54) POWER MANAGEMENT SYSTEM, SYSTEM-ON-CHIP INCLUDING THE SAME AND MOBILE DEVICE INCLUDING THE SAME

(71) Applicants: Jin-Ook Song, Hwaseong-si (KR); Jae-Gon Lee, Yongin-si (KR)

(72) Inventors: Jin-Ook Song, Hwaseong-si (KR); Jae-Gon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 98 days.

(21) Appl. No.: 14/710,624

(22) Filed: May 13, 2015

(65) Prior Publication Data

US 2016/0026498 A1 Jan. 28, 2016

(30) Foreign Application Priority Data

Jul. 25, 2014 (KR) .................. 10-2014-0094545

(51) Int. Cl.
G06F 1/00 (2006.01)
G06F 9/48 (2006.01)
G06F 9/26 (2006.01)
G06F 9/38 (2006.01)
G06F 1/03 (2006.01)

(52) U.S. Cl.
CPC .............. *G06F 9/4881* (2013.01); *G06F 1/03* (2013.01); *G06F 9/26* (2013.01); *G06F 9/3877* (2013.01)

(58) Field of Classification Search
CPC .......... G06F 9/4881; G06F 1/103; G06F 9/26; G06F 9/3877
See application file for complete search history.

(56) References Cited

U.S. PATENT DOCUMENTS

| 5,546,591 | A | * | 8/1996 | Wurzburg | G06F 1/3215 713/321 |
|---|---|---|---|---|---|
| 5,996,083 | A | * | 11/1999 | Gupta | G06F 1/3203 712/E9.049 |
| 6,834,353 | B2 | * | 12/2004 | Smith | G06F 1/3203 713/300 |
| 7,178,044 | B2 | | 2/2007 | Pappalardo et al. | |
| 7,197,652 | B2 | | 3/2007 | Keller, Jr. et al. | |
| 7,581,124 | B1 | * | 8/2009 | Jacobson | G11C 5/14 713/300 |
| 7,627,770 | B2 | | 12/2009 | Jones | |

(Continued)

FOREIGN PATENT DOCUMENTS

KR 10-2013-0030683 A 3/2013

*Primary Examiner* — Xuxing Chen
(74) *Attorney, Agent, or Firm* — Myers Bigel, P.A.

(57) ABSTRACT

A power management system controlling power for a plurality of functional blocks included in a system-on-chip includes a plurality of programmable nano controllers, an instruction memory and a signal map memory. The instruction memory is shared by the nano controllers and stores a plurality of instructions that are used by the nano controllers. The signal map memory is shared by the nano controllers and stores a plurality of signals that are provided to the functional blocks and are controlled by the nano controllers. A first nano controller among the plurality of nano controllers is programmed as a central sequencer. Second through n-th nano controllers among the plurality of nano controllers are programmed as first sub-sequencers that are dependent on the first nano controller.

20 Claims, 18 Drawing Sheets

(56) References Cited

U.S. PATENT DOCUMENTS

| | | |
|---|---|---|
| 8,108,863 B2 | 1/2012 | Rakvic et al. |
| 8,219,993 B2 | 7/2012 | Johnson et al. |
| 8,286,014 B2 | 10/2012 | Han et al. |
| 8,302,098 B2 | 10/2012 | Johnson et al. |
| 8,341,436 B2 | 12/2012 | Ehmann |
| 8,533,716 B2 | 9/2013 | Lippett |
| 2002/0184547 A1* | 12/2002 | Francis ................ G06F 1/3287 713/322 |
| 2003/0120896 A1 | 6/2003 | Gosior et al. |
| 2012/0179938 A1 | 7/2012 | Nijhawan et al. |

* cited by examiner

US 9,665,399 B2

POWER MANAGEMENT SYSTEM, SYSTEM-ON-CHIP INCLUDING THE SAME AND MOBILE DEVICE INCLUDING THE SAME

CROSS-REFERENCE TO RELATED APPLICATION

This application claims priority under 35 U.S.C. §119 to Korean Patent Application No. 10-2014-0094545, filed on Jul. 25, 2014 in the Korean Intellectual Property Office (KIPO), the entire content of which is hereby incorporated by reference herein in its entirety.

BACKGROUND

A system-on-chip (SoC) generally, refers to a processing system that integrates various functional blocks (e.g., a central processing unit, a memory, an interface unit, a digital signal processing unit, an analog signal processing unit, etc.) in a single, or a few, semiconductor integrated circuits (ICs) to implement an electronic system, such as a computer system, using a limited number of ICs.

SoCs have evolved to complex systems including various functions such as multimedia, graphics, interfaces, security functionality, etc. As diverse capabilities and functionality converge in portable devices that are battery-powered, efforts are ongoing to reduce power consumption in such portable devices while enhancing the performance thereof.

SUMMARY

Example embodiments of the present disclosure provide power management systems that have relatively simple structures and that may efficiently reduce power consumption.

Example embodiments of the present disclosure also provide SoCs that include such power management systems, as well as mobile devices that include such SoCs.

According to example embodiments, a power management system is provided for controlling power for a plurality of functional blocks included in an SoC. This power management system includes a plurality of nano controllers, an instruction memory and a signal map memory. The plurality of nano controllers includes first through n-th nano controllers, where n is a natural number equal to or greater than two, that are programmable nano controllers. The instruction memory is shared by the plurality of nano controllers and stores a plurality of instructions that are used by the plurality of nano controllers. The signal map memory is shared by the plurality of nano controllers and stores a plurality of signals that are provided to the plurality of functional blocks that are under the control of the plurality of nano controllers. The first nano controller is programmed as a central sequencer. The second through n-th nano controllers are programmed as first sub-sequencers that are dependent on the first nano controller.

Each of the plurality of nano controllers may include an instruction address generator, an instruction register, an instruction decoder and an instruction execution unit. The instruction address generator may be configured to generate a target instruction address based on a job request. The instruction register may be configured to fetch a target instruction that is included in the plurality of instructions based on the target instruction address. The instruction decoder may be configured to decode the target instruction. The instruction execution unit may be configured to execute the target instruction.

In an example embodiment, the job request may include the target instruction address. The instruction address generator may include a program counter. The program counter may be configured to store and output the target instruction address.

In an example embodiment, the job request may include a job command. The instruction address generator may include a command decoder and a program counter. The command decoder may be configured to decode the job command to generate the target instruction address. The program counter may be configured to store and output the target instruction address.

The command decoder may be implemented with hardware or may be implemented with software that is executable by each of the plurality of nano controllers.

In an example embodiment, the first nano controller may further include a job allocation state register. The job allocation state register may be configured to store present job states of the plurality of nano controllers.

In an example embodiment, the first nano controller may be configured to allocate a first target job that corresponds to a first job request to one of the first through n-th nano controllers in response to receiving the first job request from an external device.

The first nano controller may be configured to allocate the first target job to the first nano controller if the first nano controller is in an idle state when the first job request is processed. The first nano controller may be configured to allocate the first target job to one of the second through n-th nano controllers if a second target job that is different from the first target job is allocated to the first nano controller when the first job request is processed.

The first nano controller may be configured to allocate the first target job to the second nano controller by calling the second nano controller based on a call instruction included in the plurality of instructions and an identification (ID) of the second nano controller, and by providing the first job request to the second nano controller. When the first target job is completed by the second nano controller, the second nano controller may be configured to notify the first nano controller that the first target job has been completed using a return instruction that is included in the plurality of instructions.

In an example embodiment, the first nano controller may receive a plurality of job requests from an external device. The first through n-th nano controllers may be configured to perform the plurality of target jobs that correspond to the plurality of job requests based on a multi-thread scheme.

In an example embodiment, the plurality of nano controller further includes (n+1)-th through m-th nano controllers that are programmed as second sub-sequencers that are dependent on the second nano controller, where m is a natural number equal to or greater than (n+1).

In an example embodiment, the second through n-th nano controllers may be configured to control the power for respective ones of the plurality of functional blocks.

In an example embodiment, the plurality of signals may include reset signals, power supply voltages and data retention control signals. A respective one of the second through n-th nano controllers may be configured to control a respective one of a group of the reset signals, a group of the power supply voltages and a group of the data retention control signals.

The plurality of nano controllers may be configured to operate based on an asynchronous interface using a request instruction and an acknowledgement instruction.

The plurality of instructions may include a flow control instruction, a loading instruction, a storing instruction, a request instruction, an acknowledgement instruction, a call instruction, a return instruction, a wait instruction and a move instruction.

The instruction memory may include at least one static random access memory (SRAM), and the signal map memory may include at least one register.

The power management system may be part of a system-on-chip that further includes a central processing unit that is configured to control the plurality of functional blocks.

According to example embodiments, a system-on-chip (SoC) includes a central processing unit (CPU), a plurality of functional blocks and a power management system. The plurality of functional blocks are controlled by the CPU. The power management system is controlled by the CPU and controls power for the plurality of functional blocks. The power management system includes a plurality of nano controllers, an instruction memory and a signal map memory. The plurality of nano controllers are configured to be programmable. The instruction memory is shared by the plurality of nano controllers and stores a plurality of instructions that are used by the plurality of nano controllers. The signal map memory is shared by the plurality of nano controllers and stores a plurality of signals that are provided to the plurality of functional blocks and are controlled by the plurality of nano controllers. A first nano controller among the plurality of nano controllers is programmed as a central sequencer. Second through n-th nano controllers among the plurality of nano controllers are programmed as first sub-sequencers dependent on the first nano controller, where n is a natural number equal to or greater than two.

The first nano controller may receive a first job request from the CPU. A first target job corresponding to the first job request may be allocated to one of the first through n-th nano controllers to control the power for the plurality of functional blocks.

In an example embodiment, a respective one of the second through n-th nano controllers may control the power for a respective one of the plurality of functional blocks.

In an example embodiment, the plurality of signals may include reset signals, power supply voltages and data retention control signals. A respective one of the second through n-th nano controllers may control a respective one of a group of the reset signals, a group of the power supply voltages and a group of the data retention control signals.

The plurality of functional blocks may include a display control block, a file system block, a graphic processing unit (GPU) block, an image signal processing block and a multi-format codec block.

The SoC may be an application processor (AP) included in a mobile device.

According to example embodiments, a mobile device includes a plurality of functional modules and a system-on-chip (SoC). The SoC controls the plurality of functional modules. The SoC includes a central processing unit (CPU), a plurality of functional blocks and a power management system. The plurality of functional blocks are controlled by the CPU. The power management system is controlled by the CPU and controls power for the plurality of functional blocks. The power management system includes a plurality of nano controllers, an instruction memory and a signal map memory. The plurality of nano controllers are configured to be programmable. The instruction memory is shared by the plurality of nano controllers and stores a plurality of instructions that are used by the plurality of nano controllers. The signal map memory is shared by the plurality of nano controllers and stores a plurality of signals that are provided to the plurality of functional blocks and are controlled by the plurality of nano controllers. A first nano controller among the plurality of nano controllers is programmed as a central sequencer. Second through n-th nano controllers among the plurality of nano controllers are programmed as first sub-sequencers dependent on the first nano controller, where n is a natural number equal to or greater than two.

The plurality of functional modules may include a communication module, a camera module, a display module and a touch panel module.

The power management system according to example embodiments may include the plurality of nano controllers that are configured to be programmable. Thus, the plurality of nano controllers may be optimally programmed to control power of the SoC. In addition, the plurality of nano controllers may operate based on relatively simple and limited instructions, and the instruction memory and the signal map memory may be shared by the plurality of nano controllers. Accordingly, the power management system including the plurality of nano controllers may have a relatively simple structure and may efficiently reduce the power consumption of the SoC and the mobile device.

According to example embodiments, a method of controlling power delivered to a plurality of functional blocks of a system-on-chip is provided in which a first of a plurality of programmable nano controllers is designated as a central sequencer. An additional of the plurality of programmable nano controllers are designated as first sub-sequencers that are dependent on the first of the plurality of programmable nano controllers. A first job request is received. A first target job corresponding to the first job request is allocated to one of the plurality of programmable nano controllers based at least in part on a present job state of one or more of the plurality of programmable nano controllers. The first target job is performed at the allocated one of the plurality of programmable nano controllers using a first instruction that is fetched from an instruction memory that is shared by the plurality of programmable nano controllers.

In example embodiments, performing the first target job at the allocated one of the plurality of programmable nano controllers using the first instruction that is fetched from an instruction memory that is shared by the plurality of programmable nano controllers may comprise: using an address for the first instruction to fetch the first instruction from the instruction memory; decoding the first instruction at the allocated one of the plurality of programmable nano controllers; and executing the first instruction at the allocated one of the plurality programmable nano controllers.

In example embodiments, the method may also include providing a first of a plurality of signals that are stored in a signal map memory that is shared by the plurality of programmable nano controllers to a first of the plurality of functional blocks.

In example embodiments, allocating a first target job corresponding to the first job request to one of the plurality of programmable nano controllers based at least in part on a present job state of one or more of the plurality of programmable nano controllers may comprise allocating the first target job request to the first of the plurality of nano controllers if the first of the plurality of nano controllers is in an idle state.

In example embodiments, rein allocating a first target job corresponding to the first job request to one of the plurality of programmable nano controllers based at least in part on a present job state of one or more of the plurality of programmable nano controllers may comprise allocating the first target job request to a second of the plurality of nano controllers if a second target job that is different from the first target job is presently allocated to the first of the plurality of nano controllers.

In example embodiments, allocating the first target job request to the second of the plurality of nano controllers may comprise: calling the second nano controller based on a call instruction that is fetched from the instruction memory and an identification (ID) of the second nano controller, providing the first job request to the second nano controller, and receiving a return instruction from the second nano controller that is fetched by the second nano controller from the instruction memory after the first target job has been completed.

In example embodiments, the second through n-th nano controllers may be configured to control the power for respective ones of the plurality of functional blocks.

In example embodiments, the plurality of signals may include reset signals, power supply voltages and data retention control signals, and a respective one of the second through n-th nano controllers may be configured to control a respective one of a group of the reset signals, a group of the power supply voltages and a group of the data retention control signals.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
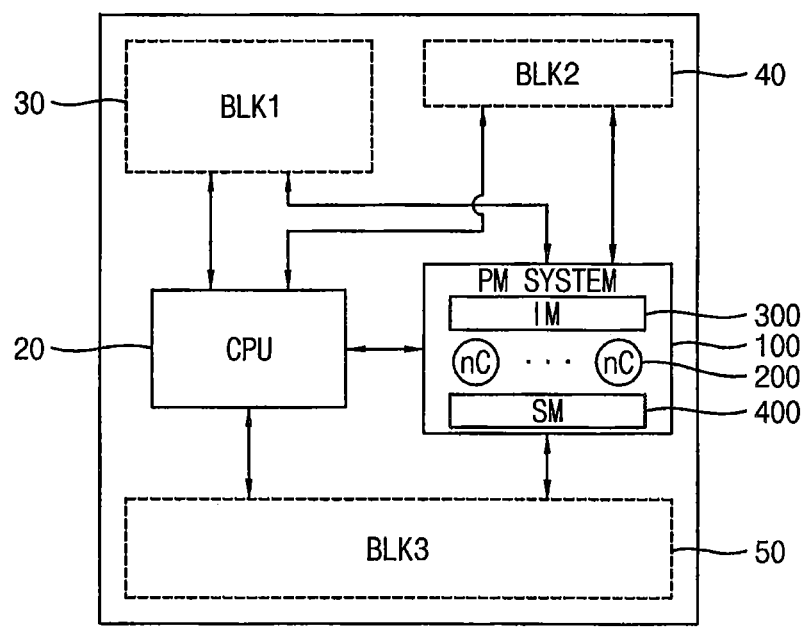
FIG. 1 is a block diagram illustrating an SoC according to example embodiments.

Various example embodiments will be described more fully with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, operations, elements, and/or components, but do not preclude the presence or addition of one or more other features, operations, elements, and/or components, or combinations thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an SoC 10 according to example embodiments.

Referring to FIG. 1, the SoC 10 includes a central processing unit (CPU) 20, a plurality of functional blocks 30, 40 and 50 and a power management system 100. Some components of the SoC 10 are omitted in FIG. 1 for convenience of illustration.

The CPU 20 controls the overall operations of the SoC 10. The CPU 20 may include a single processor core or a plurality of processor cores. For example, the CPU 20 may be a multi-core processor, such as a dual-core processor, a quad-core processor, a hex-core processor, etc.

The functional blocks 30, 40 and 50 may be controlled by the CPU 20. The functional blocks 30, 40 and 50 may each have a specific function. For example, the functional blocks 30, 40 and 50 may include a display control block, a file system block, a graphic processing unit (GPU) block, an image signal processing block, a multi-format codec block, etc. It will be appreciated that more or less than three functional blocks may be provided.

The power management system 100 is controlled by the CPU 20. The power management system 100 controls power for the functional blocks 30, 40 and 50. The power management system 100 includes a plurality of nano controllers 200, an instruction memory 300 and a signal map memory 400. The power management system 100 may have a relatively simple structure and may efficiently reduce power consumption of the SoC 10.

The configuration and operation of the power management system 100 will be described in detail below with reference to FIGS. 2 through 12.

In some example embodiments, each of the CPU 20 and the power management system 100 may be defined as one functional block.

In some example embodiments, the SoC 10 may be an application processor (AP) that is included in a mobile device. In other example embodiments, the SoC 10 may be any chip that is included in an electronic device.

Figure 2:
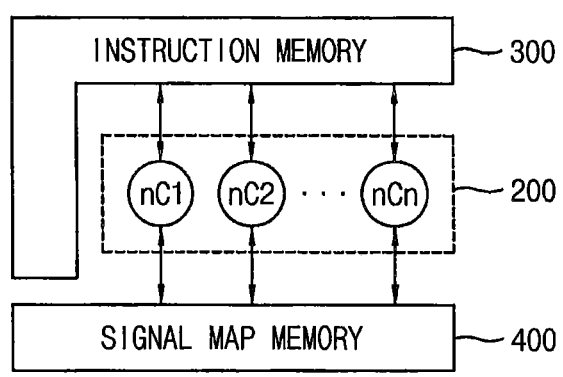
FIG. 2 is a block diagram illustrating a power management system according to example embodiments.

FIG. 2 is a block diagram illustrating an example embodiment of the power management system 100 of FIG. 1.

Referring to FIG. 2, the power management system 100 includes a plurality of nano controllers 200, an instruction memory 300 and a signal map memory 400.

The plurality of nano controllers 200 includes first through n-th nano controllers nC1, nC2, . . . , nCn, where n is a natural number equal to or greater than two. These nano controllers, which are collectively referred to as the nano controllers 200, may be programmable. In other words, the nano controllers 200 are programmable nano controllers. For example, at least some (e.g., two) of the nano controllers 200 may be programmed depending on a configuration of the SoC 10 in FIG. 1 to control the power for the functional blocks 30, 40 and 50 in FIG. 1. As will be described below with reference to FIG. 3, the first nano controller nC1 is programmed as a central sequencer, and the second through n-th nano controllers nC2, . . . , nCn are programmed as first sub-sequencers that are dependent on the first nano controller nC1. In other words, the nano controllers 200 may be programmed with a hierarchical structure.

Figure 3:
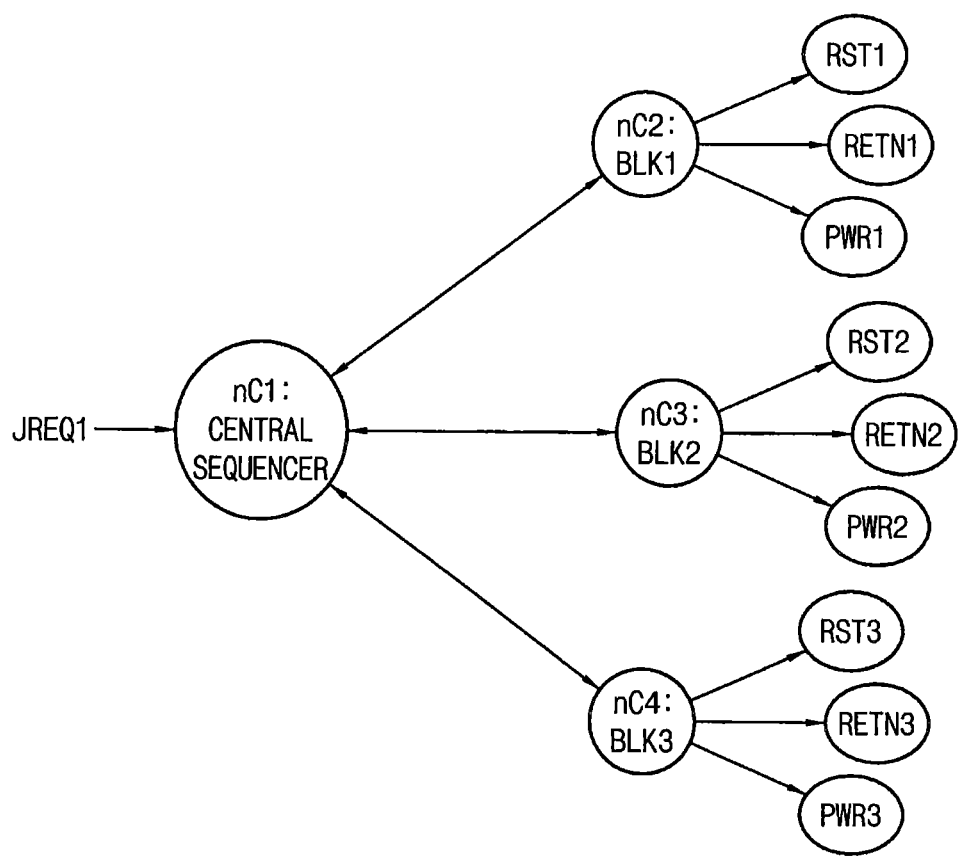
FIGS. 3, 4 and 5 are diagrams illustrating operation of the power management system of FIG. 2.
Figure 11:
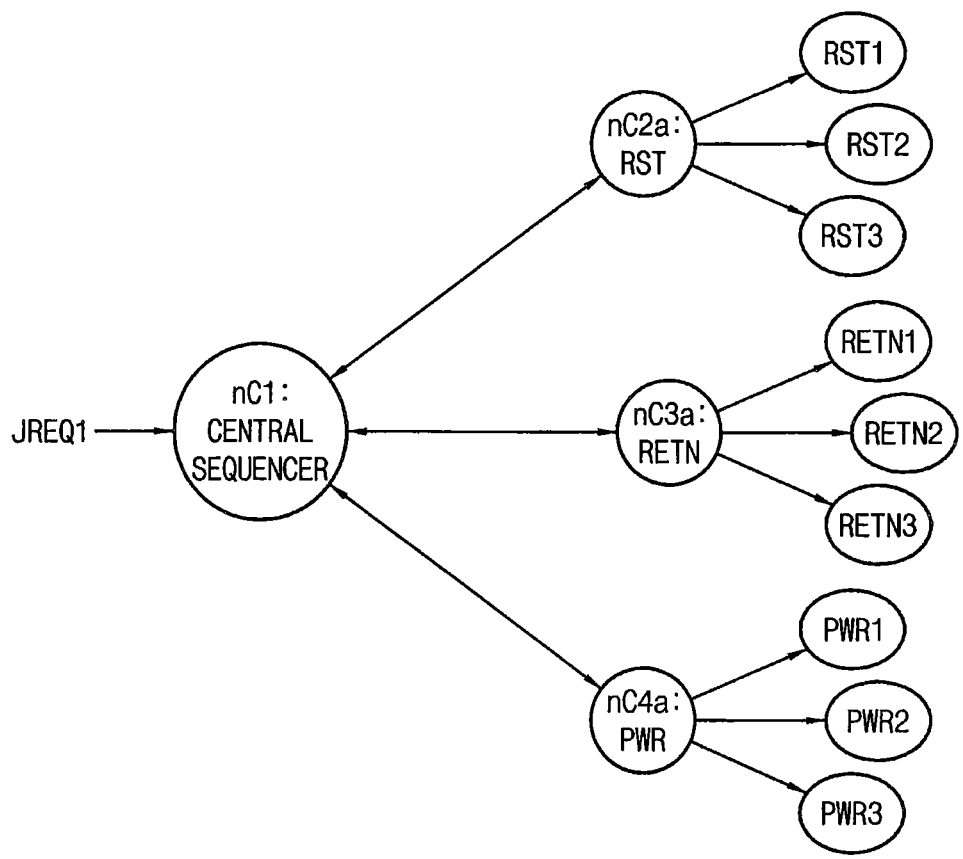

In some example embodiments, as illustrated in FIG. 3, a respective one of the second through n-th nano controllers nC2, . . . , nCn may be programmed to control the power for a respective one of the plurality of functional blocks 30, 40 and 50 in FIG. 1. In other example embodiments, as illustrated in FIG. 11, the second through n-th nano controllers nC2, . . . , nCn may be programmed to control respective ones of groups of signals that are stored in the signal map memory 400.

The instruction memory 300 stores instructions that are used by the nano controllers 200. The instruction memory 300 is shared by the nano controllers 200. In some embodiments, the instruction memory 300 may include at least one static random access memory (SRAM).

In some example embodiments, the instructions may include relatively simple and limited instructions. For example, the instructions may be 8-bit instructions. The instructions may include, for example, a flow control instruction, a loading instruction, a storing instruction, a request instruction, an acknowledgement instruction, a call instruction, a return instruction, a wait instruction and a move instruction.

The flow control instruction may include a conditional branch instruction, a jump instruction, etc. The loading instruction may be used to input a signal, and the storing instruction may be used to output a signal. The request instruction and the acknowledgement instruction may be used for an asynchronous interface and may be used as a pair of instructions. The nano controllers 200 may operate based on an asynchronous interface using the request instruction and the acknowledgement instruction. The call instruction may be used for calling one nano controller to perform a target job, and the acknowledgement instruction may be used to provide a notification that the target job has been completed. The call instruction and the return instruction may be used as a pair of instructions. The wait instruction may be used to await the expiration of a timer or the receipt of an input signal. The wait instruction may also be referred to as a delay instruction. The move instruction may be used for migrating data and/or values to a target register.

The signal map memory 400 stores signals that are provided to the functional blocks 30, 40 and 50 in FIG. 1 and is controlled by the nano controllers 200. The signal map memory 400 is shared by the nano controllers 200. The signal map memory 400 may include at least one register.

In some example embodiments, the signals may include reset signals, power supply voltages and data retention control signals. The signals may further include clock gating signals, operation frequency signals, etc.

The power management system 100 according to example embodiments may include the nano controllers 200. The nano controllers 200 may not include finite-state machines (FSMs), but may be configured to be programmable. Thus, the nano controllers 200 may be programmed to optimally control power of the SoC 10. In addition, the nano controllers 200 may operate based on relatively simple and limited instructions, and the instruction memory 300 and the signal map memory 400 may be shared by the nano controllers 200. Accordingly, the power management system 100 including the nano controllers 200 may have a relatively simple structure and may efficiently reduce the power consumption of the SoC 10.

Figure 4:
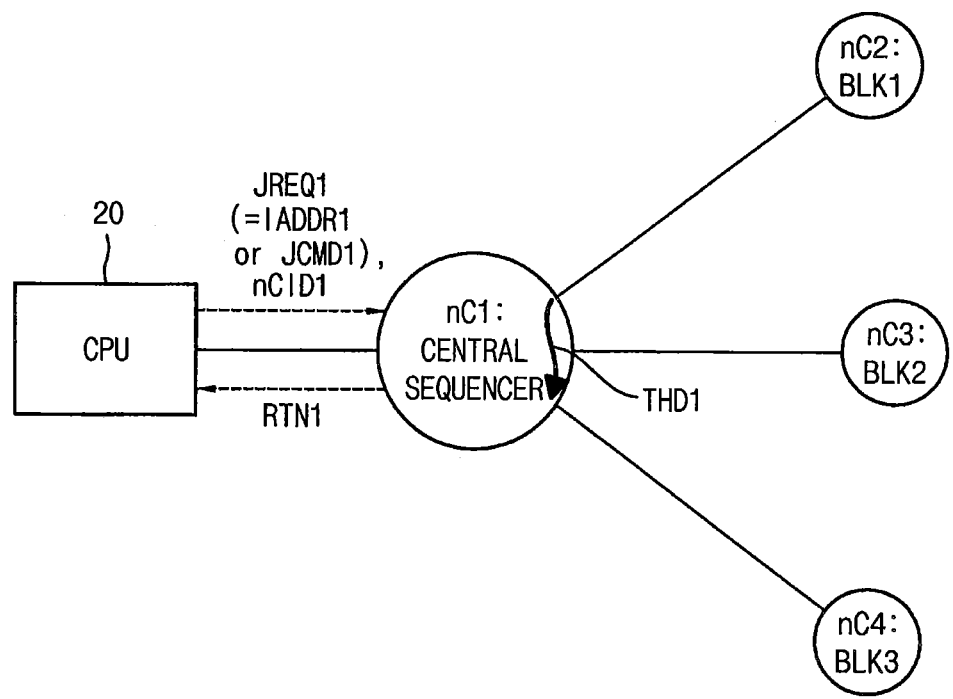
Figure 5:
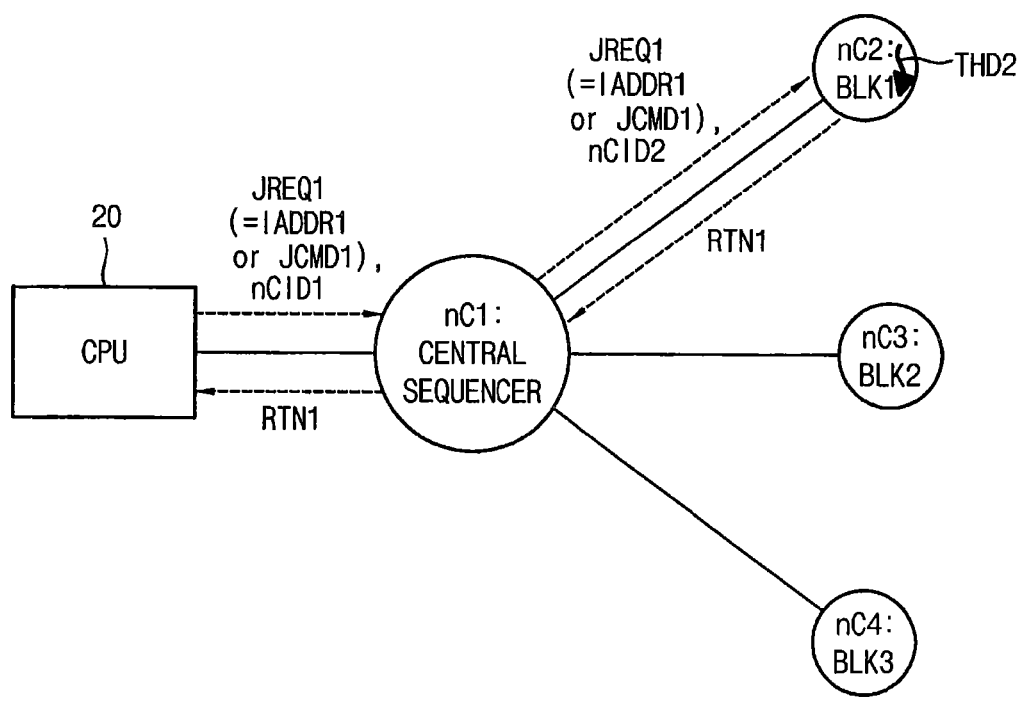

FIGS. 3, 4 and 5 are diagrams that describe operations of the power management system of FIG. 2.

Referring to FIGS. 1-5, a first nano controller nC1 may be programmed as the central sequencer. Some of the nano controllers nC2, . . . , nCn other than the first nano controller nC1 may be programmed as sub-sequencers that are dependent on the central sequencer. In the example of FIG. 3, second, third and fourth nano controllers nC2, nC3 and nC4 may be programmed as the sub-sequencers that are dependent on the first nano controller nC1.

In some example embodiments, the nano controllers nC2, nC3 and nC4 may control the power for respective ones of the functional blocks 30, 40 and 50. For example, the second nano controller nC2 may control the power for first functional block 30, the third nano controller nC3 may control the power for second functional block 40, and the fourth nano controller nC4 may control the power for third functional block 50. In other words, the second nano controller nC2 may control a first reset signal RST1, a first power supply voltage PWR1 and a first data retention control signal RETN1 that are provided to the first functional block 30. The third nano controller nC3 may control a second reset signal RST2, a second power supply voltage PWR2 and a second data retention control signal RETN2 that are provided to the second functional block 40. The fourth nano controller nC4 may control a third reset signal RST3, a third power supply voltage PWR3 and a third data retention control signal RETN3 that are provided to the third functional block 50.

Although FIG. 3 illustrates an example where three nano controllers nC2, nC3 and nC4 are programmed as sub-sequencers that are dependent on the central sequencer nC1 and each of three nano controllers nC2, nC3 and nC4 control the power for a respective one of the functional blocks 30, 40 and 50, the number of the nano controllers that are programmed as sub-sequencers is not limited thereto, but may be changed.

The first nano controller nC1 may receive a first job request JREQ1 from an external device. For example, the first job request JREQ1 may be provided to the first nano controller nC1 from the CPU 20 that is included in the SoC 10. The first nano controller nC1 may allocate a first target job corresponding to the first job request JREQ1 to one of the first through fourth nano controllers nC1, nC2, nC3 and nC4.

In some example embodiments, as illustrated in FIG. 4, the CPU 20 may provide the first job request JREQ1 to the first nano controller nC1. For example, the CPU 20 may call the first nano controller nC1 based on a first identification (ID) nCID1 of the first nano controller nC1 and the call instruction. The CPU 20 may provide the first job request JREQ1 to the called first nano controller nC1.

When the first nano controller nC1 is in an idle state (e.g., when any target jobs are not allocated to the first nano controller nC1), the first nano controller nC1 may perform the first target job based on the first job request JREQ1. For example, the first nano controller nC1 may perform the first target job based on a single-thread scheme THD1.

The first job request JREQ1 may include a first target instruction address IADDR1 or a first job command JCMD1. The first target instruction address IADDR1 may be an address for directly accessing the instruction memory 300. The first job command JCMD1 may be a command used by the CPU 20. The first nano controller nC1 may perform the first target job based on the first target instruction address IADDR1 or the first job command JCMD1.

Operations of the first nano controller nC1 for performing the first target job based on the first target instruction address IADDR1 or the first job command JCMD1 will be described below with reference to FIGS. 6, 7 and 8.

When the first target job is completed by the first nano controller nC1, the first nano controller nC1 may use a return instruction RTN1 to notify the CPU 20 that the first target job has been completed.

Referring to FIG. 5, the CPU 20 may provide the first job request JREQ1 to the first nano controller nC1 when a second target job has already been allocated to the first nano controller nC1.

Since the second target job is already allocated to the first nano controller nC1, the first nano controller nC1 cannot perform the first target job, and thus the first nano controller nC1 may allocate the first target job to one of the second through fourth nano controllers nC2, nC3 and nC4.

For example, when the first target job is to be allocated to the second nano controller nC2 (e.g., when the first target job is a job for controlling the power for the first functional block 30), the first nano controller nC1 may call the second nano controller nC2 based on a second ID nCID2 of the second nano controller nC2 and the call instruction. The first nano controller nC1 may provide the first job request JREQ1 to the called second nano controller nC2.

The second nano controller nC2 may perform the first target job based on the first job request JREQ1. For example, the second nano controller nC2 may perform the first target job based on a single-thread scheme THD2. The first job request JREQ1 may include the first target instruction address IADDR1 or the first job command JCMD1.

Operations of the second nano controller nC2 for performing the first target job based on the first target instruction address IADDR1 or the first job command JCMD1 will be described below with reference to FIG. 9.

When the first target job is completed by the second nano controller nC2, the second nano controller nC2 may use a return instruction RTN1 to notify the first nano controller nC1 that the first target job is completed. The first nano controller nC1 may likewise use a return instruction RTN1 to notify the CPU 20 that the first target job is completed.

Although FIGS. 3, 4 and 5 illustrate examples where the power management system receives one job request JREQ1 and performs one target job, the power management system may sequentially or simultaneously receive multiple job requests. In this case, each of the target jobs corresponding to the respective job requests may be allocated to a respective one of the nano controllers, and a respective one of the nano controllers may perform a respective one of the target jobs.

Figure 6:
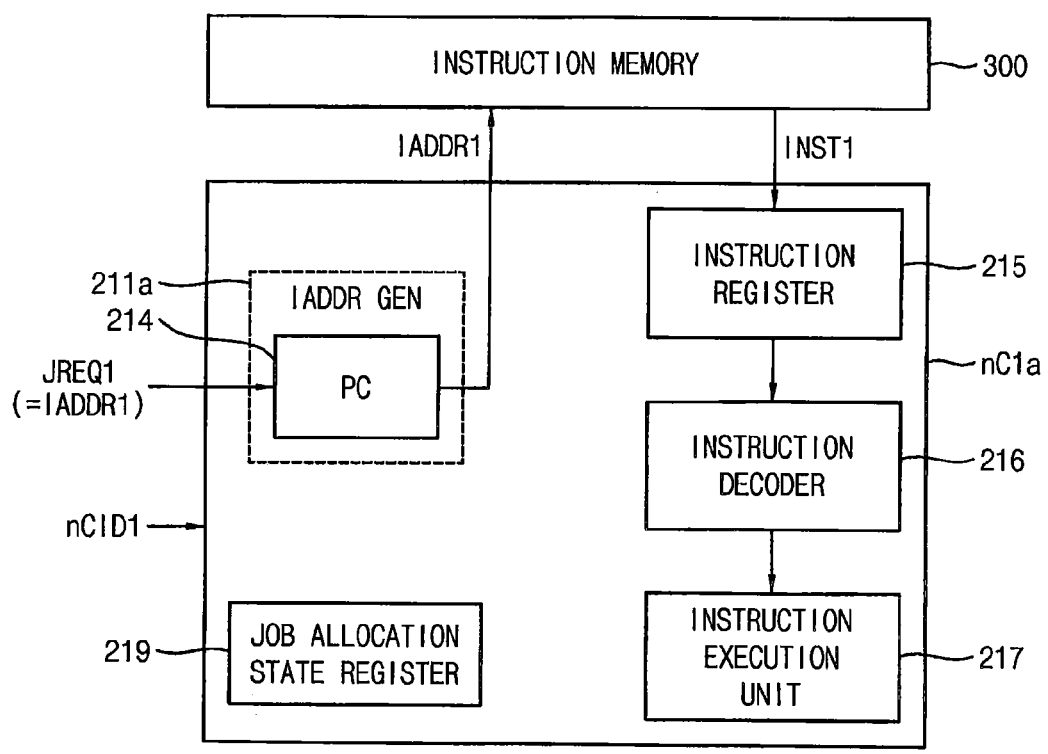
FIGS. 6, 7 and 8 are block diagrams illustrating example implementations of a first nano controller that is included in the power management system of FIG. 2.
Figure 7:
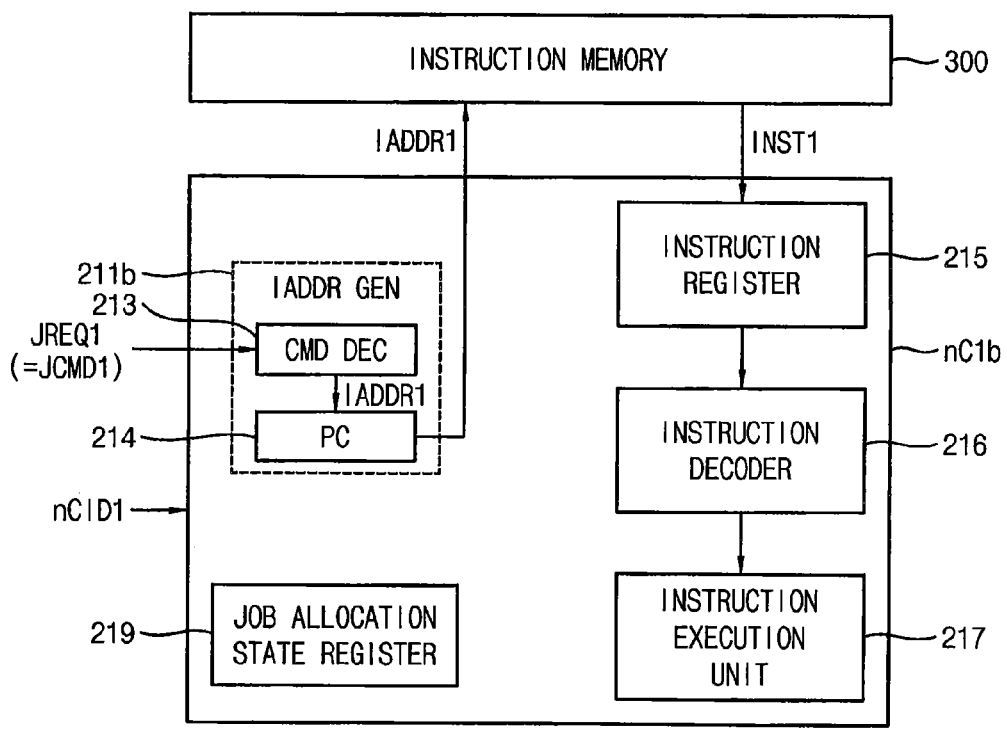
Figure 8:
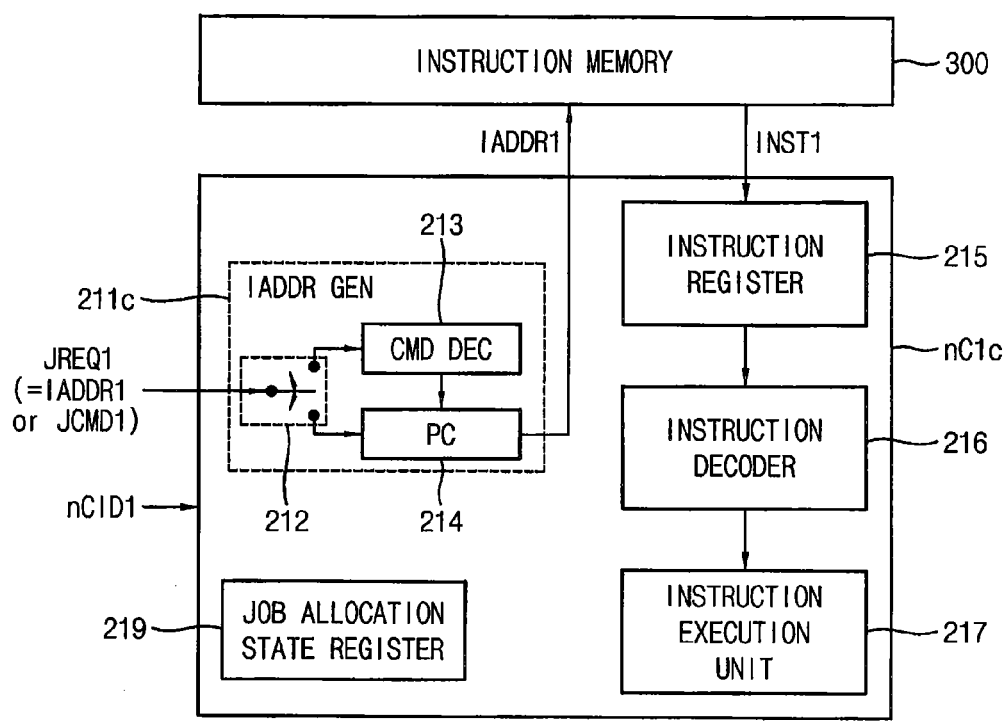

FIGS. 6, 7 and 8 are block diagrams illustrating three example embodiments nC1a, nC1b, nC1c of the first nano controller nC1 that is included in the power management system of FIG. 2.

Hereinafter, the example embodiments of FIGS. 6, 7 and 8 will be described based on the example in FIG. 4 where the first target job corresponding to the first job request JREQ1 is allocated to the first nano controller nC1 based on the first ID nCID1.

Referring to FIG. 6, a first nano controller nC1a may include an instruction address generator 211a, an instruction register 215, an instruction decoder 216 and an instruction execution unit 217. The first nano controller nC1a may further include a job allocation state register 219.

The instruction address generator 211a may generate the first target instruction address IADDR1 based on the first job request JREQ1. For example, the first job request JREQ1 may directly include the first target instruction address IADDR1. In this case, the instruction address generator 211a may include a program counter 214 that stores and outputs the first target instruction address IADDR1.

The instruction register 215 may fetch a first target instruction INST1 included in the instructions that are stored in the instruction memory 300 based on the first target instruction address IADDR1. The instruction register 215 may store the first target instruction INST1.

The instruction decoder 216 may decode the fetched first target instruction INST1. The instruction execution unit 217 may execute the decoded first target instruction INST1. For example, the instruction execution unit 217 may include an arithmetic logic unit (ALU).

The job allocation state register 219 may represent present job states of the plurality of nano controllers 200 in FIG. 2. For example, the job allocation state register 219 may store a plurality of values that correspond to the present job states of the respective nano controllers 200 in FIG. 2.

In some example embodiments, a k-th value among the plurality of values may correspond to a state of a k-th nano controller, where k is a natural number equal to or greater than one and equal to or smaller than n. When any target jobs are not allocated to the k-th nano controller, the k-th value may be set to a first logic level (e.g., '0'). When a target job is allocated to the k-th nano controller and the k-th nano controller performs the target job, the k-th value may be set to a second logic level (e.g., '1'). For example, when the first nano controller nC1a is in an idle state, a first value that is stored in the job allocation state register 219 that indicates the state of the first nano controller nC1a may be set to the first logic level. When the first target job is allocated to the first nano controller nC1a and the first nano controller 210a performs the first target job, the first value may be set instead to the second logic level. When the first target job is completed by the first nano controller nC1a, the first value may be set back to the first logic level.

Referring to FIG. 7, a first nano controller nC1b may include an instruction address generator 211b, an instruction register 215, an instruction decoder 216 and an instruction execution unit 217. The first nano controller nC1b may further include a job allocation state register 219.

The instruction address generator 211b may generate the first target instruction address IADDR1 based on the first job request JREQ1. For example, the first job request JREQ1 may include the first job command JCMD1. In this case, the instruction address generator 211b may include a command decoder 213 and a program counter 214. The command decoder 213 may decode the first job command JCMD1 to generate the first target instruction address IADDR1. The program counter 214 may store and may output the first target instruction address IADDR1.

In some example embodiments, the command decoder 213 may be implemented with hardware. In other example embodiments, the command decoder 213 may be implemented with software that is executable by the first nano controller nC1b.

The instruction register 215, the instruction decoder 216, the instruction execution unit 217 and the job allocation state register 219 in FIG. 7 may be substantially the same as the instruction register 215, the instruction decoder 216, the instruction execution unit 217 and the job allocation state register 219 in FIG. 6, respectively. For example, the instruction register 215 may fetch a first target instruction INST1 from the instruction memory 300 based on the first target instruction address IADDR1. The instruction decoder 216 may decode the first target instruction INST1. The instruction execution unit 217 may execute the first target instruction INST1. The job allocation state register 219 may store present job states of the plurality of nano controllers 200 in FIG. 2.

Referring to FIG. 8, a first nano controller nC1c may include an instruction address generator 211c, an instruction register 215, an instruction decoder 216 and an instruction execution unit 217. The first nano controller nC1c may further include a job allocation state register 219.

The instruction address generator 211c may generate the first target instruction address IADDR1 based on the first job request JREQ1. For example, the first job request JREQ1 may include the first target instruction address IADDR1 or the first job command JCMD1. In this case, the instruction address generator 211c may include a selector 212, a command decoder 213 and a program counter 214. When the first job request JREQ1 includes the first job command JCMD1, the selector 212 may provide the first job command JCMD1 to the command decoder 213. When the first job request JREQ1 includes the first target instruction address IADDR1, the selector 212 may provide the first target instruction address IADDR1 to the program counter 214. The command decoder 213 may decode the first job command JCMD1 to generate the first target instruction address IADDR1. The program counter 214 may store and may output the first target instruction address IADDR1.

The instruction register 215, the instruction decoder 216, the instruction execution unit 217 and the job allocation state register 219 in FIG. 8 may be substantially the same as the instruction register 215, the instruction decoder 216, the instruction execution unit 217 and the job allocation state register 219 in FIG. 6, respectively.

Figure 9:
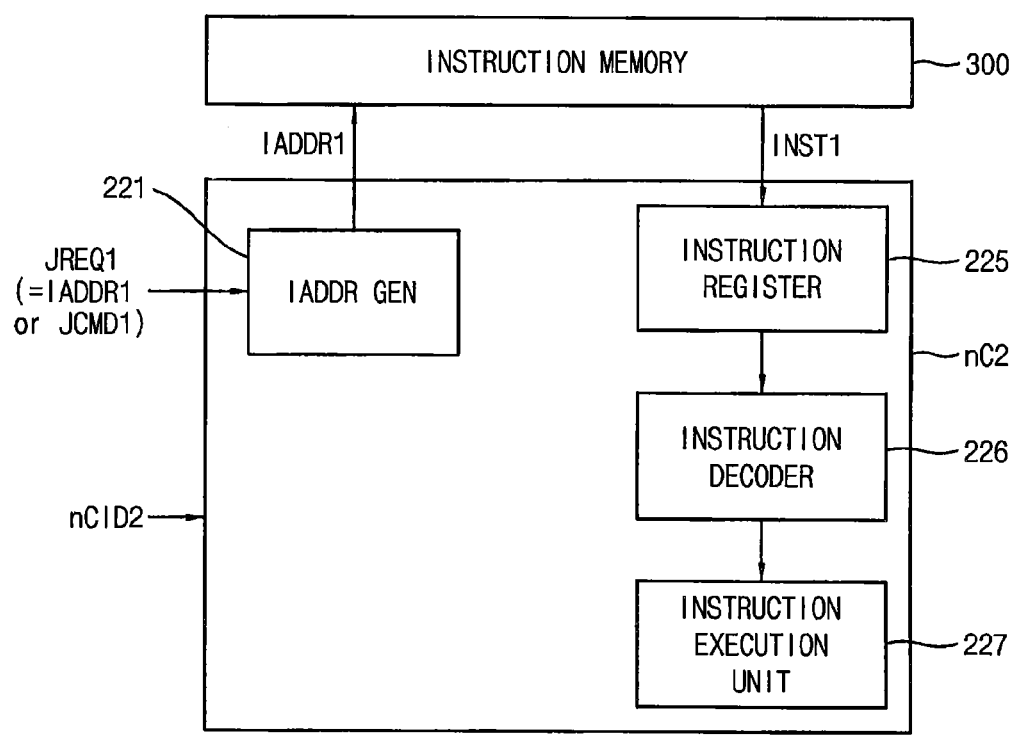
FIG. 9 is a block diagram illustrating an example embodiment of a second nano controller included in the power management system of FIG. 2.

FIG. 9 is a block diagram illustrating an example embodiment of a second nano controller nC2 that is included in the power management system of FIG. 2.

Hereinafter, the example embodiment of FIG. 9 will be described based on the example in FIG. 5 where the first target job corresponding to the first job request JREQ1 is allocated to the second nano controller based on the second ID nCID2.

Referring to FIG. 9, the second nano controller nC2 may include an instruction address generator 221, an instruction register 225, an instruction decoder 226 and an instruction execution unit 227.

The instruction address generator 221 may generate the first target instruction address IADDR1 based on the first job request JREQ1. In some example embodiments, as illustrated in FIG. 6, the instruction address generator 221 may include a program counter. In other example embodiments, as illustrated in FIG. 7, the instruction address generator 221 may include a command decoder and a program counter. In still other example embodiments, as illustrated in FIG. 8, the instruction address generator 221 may include a selector, a command decoder and a program counter.

The instruction register 225 may fetch a first target instruction INST1 from the instruction memory 300 based on the first target instruction address IADDR1. The instruction decoder 226 may decode the first target instruction INST1. The instruction execution unit 227 may execute the first target instruction INST1.

Differently from the first nano controller nC1a in FIG. 6, the first nano controller nC1b in FIG. 7 and the first nano controller nC1c in FIG. 8, a job allocation state register may be omitted in the second nano controller nC2 in FIG. 9. In some example embodiments, the second nano controller nC2 may not include the job allocation state register. In other example embodiments, the second nano controller nC2 may include the job allocation state register, however, the job allocation state register in the second nano controller nC2 may not be enabled.

Although not illustrated in FIGS. 6, 7, 8 and 9, the second through n-th nano controllers nC2, . . . , nCn in FIG. 2 that are programmed as the first sub-sequencers may have substantially the same structure. For example, like the second nano controller nC2 in FIG. 9, each of the third and fourth nano controllers nC3 and nC4 in FIGS. 3, 4 and 5 may include an instruction address generator, an instruction register, an instruction decoder and an instruction execution unit. A job allocation state register may be omitted in each of the third and fourth nano controllers nC3 and nC4 in FIGS. 3, 4 and 5.

Figure 10:
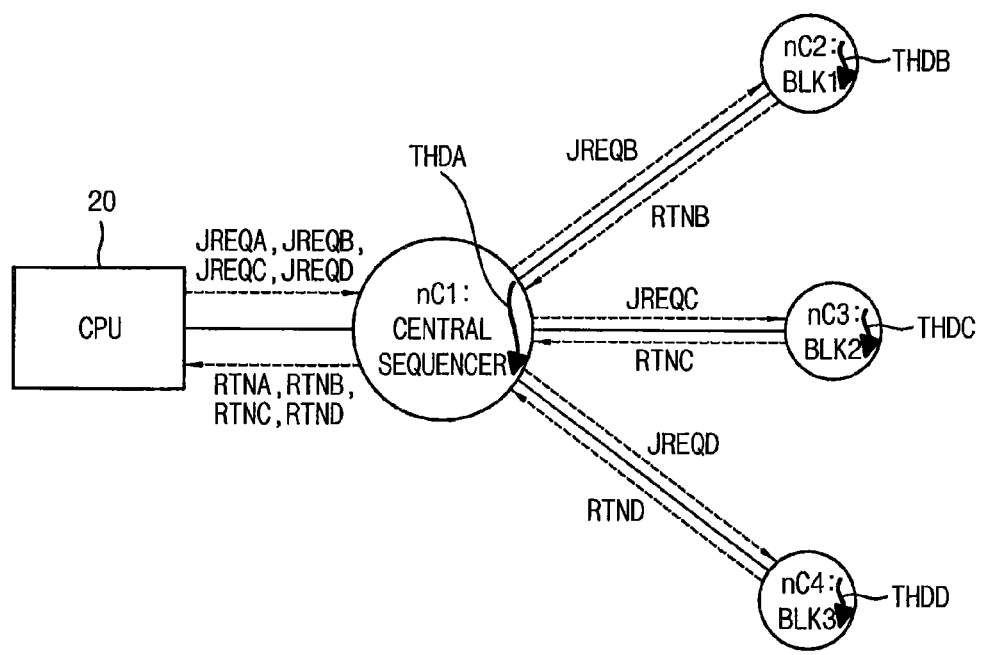
FIGS. 10, 11 and 12 are diagrams illustrating operation of the power management system of FIG. 2.
Figure 12:
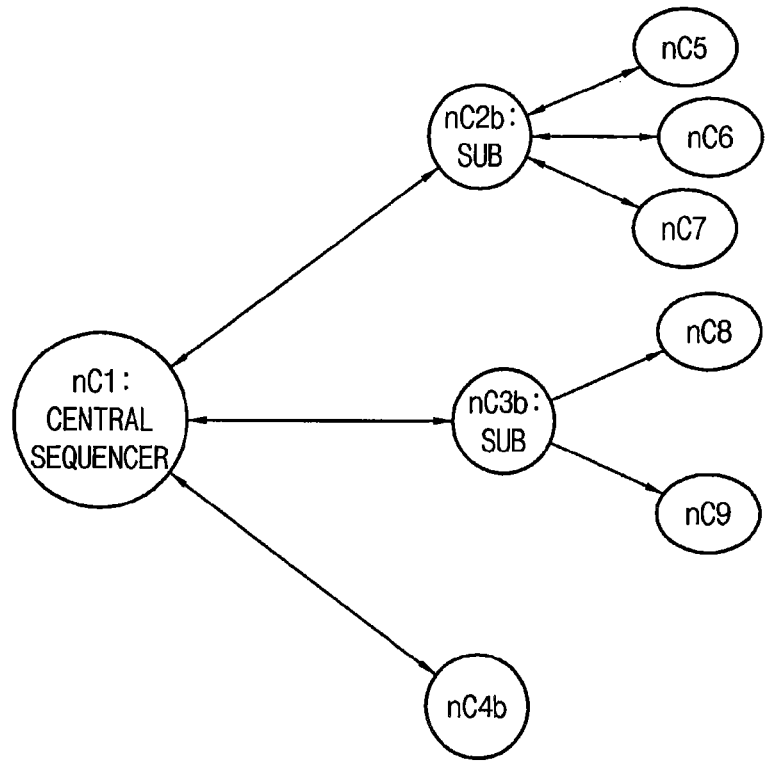

FIGS. 10, 11 and 12 are diagrams for describing operations of the power management system of FIG. 2.

Referring to FIGS. 1, 2 and 10, a first nano controller nC1 may be programmed as the central sequencer. Second, third and fourth nano controllers nC2, nC3 and nC4 may be programmed as sub-sequencers that are dependent on the first nano controller nC1. Similar to the example of FIG. 3, each of the nano controllers nC2, nC3 and nC4 may control the power for a respective one of the functional blocks 30, 40 and 50.

The CPU 20 may provide a plurality of job requests JREQA, JREQB, JREQC and JREQD to the first nano controller nC1. The first nano controller nC1 may allocate a plurality of target jobs corresponding to the job requests JREQA, JREQB, JREQC and JREQD to the first through fourth nano controllers nC1, nC2, nC3 and nC4. In this case, as described above with reference to FIGS. 4 and 5, the plurality of target jobs may be allocated to the first through fourth nano controllers nC1, nC2, nC3 and nC4 based on the present job states of the first through fourth nano controllers nC1, nC2, nC3 and nC4. For example, a first target job corresponding to the first job request JREQA may be allocated to the first nano controller nC1. A second target job corresponding to the second job request JREQB may be allocated to the second nano controller nC2. A third target job corresponding to the third job request JREQC may be allocated to the third nano controller nC3. A fourth target job corresponding to the fourth job request JREQD may be allocated to the fourth nano controller nC4.

The first through fourth nano controllers nC1, nC2, nC3 and nC4 may perform the target jobs based on the job requests JREQA, JREQB, JREQC and JREQD. For example, the first through fourth nano controllers nC1, nC2, nC3 and nC4 may perform the target jobs based on a multi-thread scheme THDA, THDB, THDC and THDD. In other words, the target jobs may be performed substantially simultaneously within a single process.

When the plurality of target jobs are completed by the first through fourth nano controllers nC1, nC2, nC3 and nC4, the second through fourth nano controllers nC2, nC3 and nC4 may use return instructions RTNB, RTNC and RTND, respectively, to notify the first nano controller nC1 that the second, third and fourth target jobs have been completed. The first nano controller nC1 may use return instructions RTNA, RTNB, RTNC and RTND to notify the CPU 20 that the first, second, third and fourth target jobs have been completed.

Referring to FIGS. 1, 2 and 11, a first nano controller nC1 may be programmed as the central sequencer. Some of the nano controllers other than the first nano controller nC1 may be programmed as sub-sequencers that are dependent on the central sequencer. In the example of FIG. 11, second, third and fourth nano controllers nC2a, nC3a and nC4 are programmed as sub-sequencers that are dependent on the first nano controller nC1.

In some example embodiments, each of the nano controllers nC2a, nC3a and nC4a may control each group of signals stored in the signal map memory 400. For example, the second nano controller nC2a may control a group of reset signals, the third nano controller nC3a may control a group of data retention control signals, and the fourth nano controller nC4a may control a group of power supply voltages. In other words, the second nano controller nC2a may control a first reset signal RST1 that is provided to the first functional block 30, a second reset signal RST2 that is provided to the second functional block 40 and a third reset signal RST3 that is provided to the third functional block 50. The third nano controller nC3a may control a first data retention control signal RETN1 that is provided to the first functional block 30, a second data retention control signal RETN2 that is provided to the second functional block 40 and a third data retention control signal RETN3 that is provided to the third functional block 50. The fourth nano controller nC4a may control a first power supply voltage PWR1 that is provided to the first functional block 30, a second power supply voltage PWR2 that is provided to the second functional block 40 and a third power supply voltage PWR3 that is provided to the third functional block 50.

As described above with reference to FIGS. 4, 5 and 10, at least one target job may be allocated to at least one of the first through fourth nano controllers nC1, nC2a, nC3a and nC4a based on the present job states of the first through fourth nano controllers nC1, nC2a, nC3a and nC4a. The at least one of the first through fourth nano controllers nC1, nC2a, nC3a and nC4a may perform the at least one target job based on the single-thread scheme or the multi-thread scheme.

Referring to FIGS. 1, 2 and 12, a first nano controller nC1 may be programmed as the central sequencer. Some of the nano controllers other than the first nano controller nC1 may be programmed as first sub-sequencers that are dependent on the central sequencer. Still other of the nano controllers, other than the first nano controller nC1, may be programmed as second sub-sequencers that are dependent on the first sub-sequencers. In the example of FIG. 12, second, third and fourth nano controllers nC2b, nC3b and nC4b may be programmed as first sub-sequencers that are dependent on the first nano controller nC1. Fifth, sixth and seventh nano controllers nC5b, nC6b and nC7b may be programmed as second sub-sequencers that are dependent on the second nano controller nC2b. Eighth and ninth nano controllers nC8b and nC9b may be programmed as second sub-sequencers that are dependent on the third nano controller nC3b.

In some example embodiments, each of the second through fourth nano controllers nC2b, nC3b and nC4b and the fifth through ninth nano controllers nC5b, nC6b, nC7b, nC8b and nC9b may control the power for respective ones of the functional blocks included in the SoC 10. In other example embodiments, each of the second through fourth nano controllers nC2b, nC3b and nC4b and the fifth through ninth nano controllers nC5b, nC6b, nC7b, nC8b and nC9b may control respective groups of signals stored in the signal map memory 400.

As described above with reference to FIGS. 4, 5 and 10, at least one target job may be allocated to at least one of the first through ninth nano controllers nC1, nC2b, nC3b, nC4b, nC5b, nC6b, nC7b, nC8b and nC9b based on the present job states of the first through ninth nano controllers nC1, nC2b, nC3b, nC4b, nC5b, nC6b, nC7b, nC8b and nC9b. The at least one of the first through ninth nano controllers nC1, nC2b, nC3b, nC4b, nC5b, nC6b, nC7b, nC8b and nC9b may perform the at least one target job based on the single-thread scheme or the multi-thread scheme.

Figure 13:
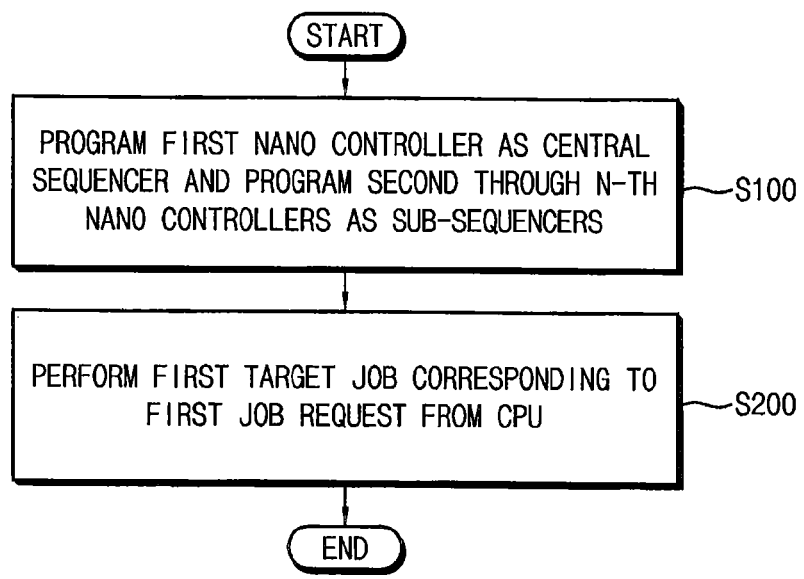
FIG. 13 is a flow chart illustrating a method of operating a power management system according to example embodiments.

FIG. 13 is a flow chart illustrating a method of operating a power management system according to example embodiments.

Referring to FIGS. 1, 2 and 13, in the method of operating the power management system 100, the first nano controller nC1 is programmed as the central sequencer, and the second through n-th nano controllers nC2, . . . , nCn are programmed as first sub-sequencers that are dependent on the first nano controller nC1 (step S100).

In some example embodiments, as illustrated in FIG. 3, a respective one of the second through n-th nano controllers nC2, . . . , nCn may be programmed to control the power for a respective one of the functional blocks 30, 40 and 50. In other example embodiments, as illustrated in FIG. 11, a respective one of the second through n-th nano controllers nC2, nCn may be programmed to control a respective one of groups of signals stored in the signal map memory 400.

One of the first through n-th nano controllers nC1, nCn performs the first target job corresponding to the first job request JREQ1 that is provided from the CPU 20 (step S200).

Although not illustrated in FIGS. 1, 2 and 13, the nano controllers 200 may further include (n+1)-th through m-th nano controllers, where m is a natural number equal to or greater than (n+1). In this case, as illustrated in FIG. 12, the (n+1)-th through m-th nano controllers may be programmed as second sub-sequencers that are dependent on the second nano controller nC2. In step S200, one of the first through m-th nano controllers may perform the first target job.

In the method of operating the power management system according to example embodiments, the nano controllers 200 may be programmed to control power of the SoC 10. In addition, the nano controllers 200 may operate based on relatively simple and limited instructions, and the instruction memory 300 and the signal map memory 400 may be shared by the nano controllers 200. Accordingly, the power management system 100 including the nano controllers 200 may have a relatively simple structure and may efficiently reduce the power consumption of the SoC 10.

Figure 14:
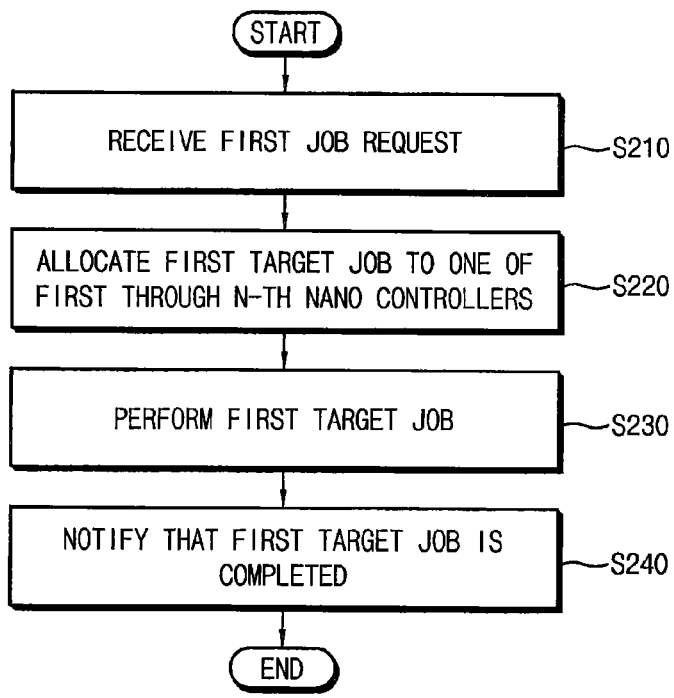
FIG. 14 is a flow chart illustrating an example of operations for performing a first target job in FIG. 13.

FIG. 14 is a flow chart illustrating an example of operations for performing a first target job in FIG. 13.

Referring to FIGS. 1, 2, 13 and 14, in step S200, the first nano controller nC1 may receive the first job request JREQ1 from the CPU 20 (step S210). For example, as described above with reference to FIGS. 4 and 5, the CPU 20 may call the first nano controller nC1 based on the first ID nCID1 of the first nano controller nC1 and the call instruction. The CPU 20 may provide the first job request JREQ1 to the called first nano controller nC1.

The first nano controller nC1 may allocate the first target job corresponding to the first job request JREQ1 to one of the first through n-th nano controllers nC1, nCn (step S220). One of the first through n-th nano controllers nC1, nCn may perform the first target job (step S230).

When the first target job is completed, the CPU 20 may be notified that the first target job has been completed (step S240). For example, as illustrated in FIG. 4, when the first target job is allocated to the first nano controller nC1 and when the first target job is completed by the first nano controller nC1, the first nano controller nC1 may use the return instruction RTN1 to notify the CPU 20 that the first target job has been completed. As another example, as illustrated in FIG. 5, when the first target job is allocated to the second nano controller nC2, after the first target job is completed by the second nano controller nC2, the second nano controller nC2 may use the return instruction RTN1 to notify the first nano controller nC1 that the first target job has been completed. The first nano controller nC1 may use the return instruction RTN1 to notify the CPU 20 that the first target job has been completed.

Figure 15:
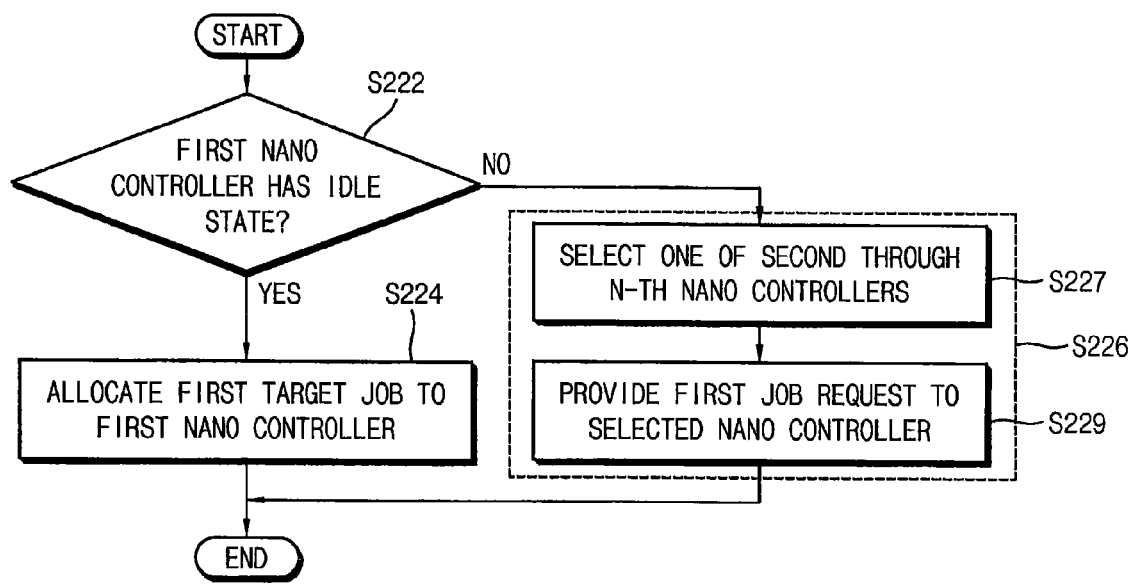
FIG. 15 is a flow chart illustrating an example of operations for allocating the first target job in FIG. 14.

FIG. 15 is a flow chart illustrating an example of operations for allocating the first target job in FIG. 14.

Referring to FIGS. 1, 2, 14 and 15, to perform step S220 of FIG. 14, the present job state of the first nano controller nC1 may be determined (step S222). In this case, as illustrated in FIGS. 6, 7 and 8, the first nano controller nC1 may include the job allocation state register 219 that stores the plurality of values corresponding to the present job states of the nano controllers 200. The present job state of the first nano controller nC1 may be determined based on a value stored in the job allocation state register 219 that corresponds to a job state of the first nano controller nC1.

When the first nano controller nC1 has the idle state, e.g., when no target jobs are currently allocated to the first nano controller nC1 (step S222: YES), the first target job may be allocated to the first nano controller nC1 (step S224). For example, as described above with reference to FIG. 4, the first nano controller nC1 may perform the first target job in step S230 of FIG. 14.

When the first nano controller nC1 is not in the idle state because a second target job that is different from the first target job is allocated to the first nano controller nC1 (step S222: NO), the first target job may be allocated to one of the second through n-th nano controllers nC2, . . . , nCn (step S226). In this case, as described above with reference to FIG. 5, the first target job may be allocated to, for example, the second nano controller nC2, and the second nano controller nC2 may perform the first target job in step S230.

For example, the present job states of the second through n-th nano controllers nC2, . . . , nCn may be determined based on the values stored in the job allocation state register 219 in FIG. 6. One of the second through n-th nano controllers nC2, . . . , nCn may be selected based on the present job states of the second through n-th nano controllers nC2, . . . , nCn (step S227). The first job request JREQ1 may be provided to the selected nano controller (e.g., the second nano controller nC2 in FIG. 5) (step S229). For example, the first nano controller nC1 may call the second nano controller nC2 based on the second ID nCID2 of the second nano controller nC2 and the call instruction. The first nano controller nC1 may provide the first job request JREQ1 to the called second nano controller nC2.

Figure 16:
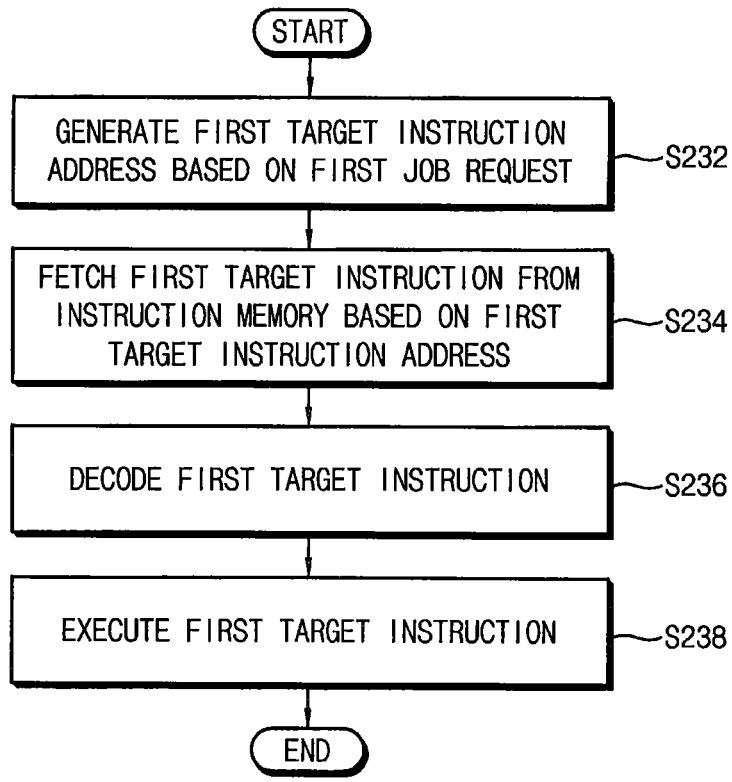
FIG. 16 is a flow chart illustrating an example of operations for performing the first target job in FIG. 14.

FIG. 16 is a flow chart illustrating an example of operations for performing the first target job in FIG. 14.

Referring to FIGS. 6, 7, 8, 9, 14 and 16, in step S230 of FIG. 14, the first target instruction address IADDR1 may be generated based on the first job request JREQ1 (step S232). For example, the first job request JREQ1 may directly include the first target instruction address IADDR1 or may include the first job command JCMD1. Each nano controller may include an instruction address generator, and the instruction address generator may include a command decoder 213 and/or a program counter 214 for generating the first target instruction address IADDR1.

The first target instruction INST1, which is included in the plurality of instructions that are stored in the instruction memory 300, may be fetched based on the first target instruction address IADDR1 (step S234). The first target instruction INST1 may be decoded (step S236). Next, the first target instruction INST1 may be executed (step S238). Each nano controller may include an instruction register 215, an instruction decoder 216 and an instruction execution unit 217 for performing such operations.

Figure 17:
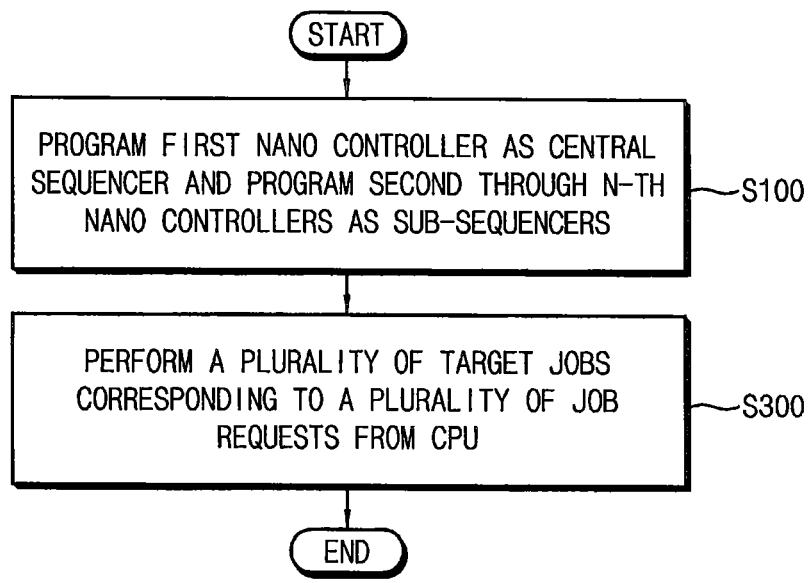
FIG. 17 is a flow chart illustrating a method of operating a power management system according to example embodiments.

FIG. 17 is a flow chart illustrating a method of operating a power management system according to example embodiments.

Referring to FIGS. 1, 2 and 17, in the method of operating the power management system 100 including the programmable nano controllers 200, the first nano controller nC1 is programmed as the central sequencer, and the second through n-th nano controllers nC2, nCn are programmed as the first sub-sequencers that are dependent on the first nano controller nC1 (step S100). Step S100 in FIG. 17 may be substantially the same as step S100 in FIG. 13.

The first through n-th nano controllers nC1, nCn perform the plurality of target jobs corresponding to the plurality of job requests JREQA, JREQB, JREQC and JREQD that are provided from the CPU 20 (step S300).

Figure 18:
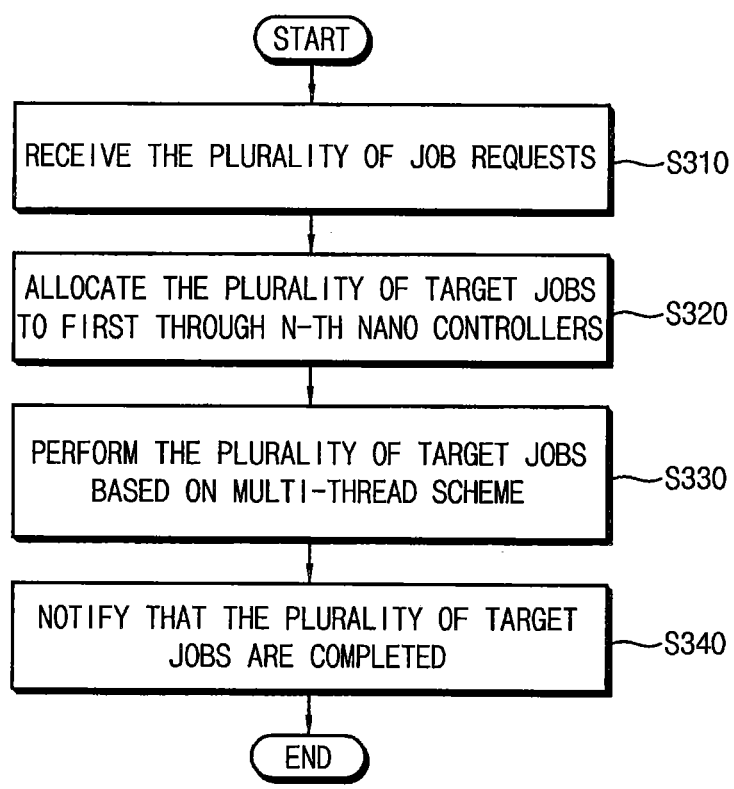
FIG. 18 is a flow chart illustrating an example of operations for performing a plurality of target jobs in FIG. 17.

FIG. 18 is a flow chart illustrating an example of operations for performing a plurality of target jobs in step S300 of FIG. 17.

Referring to FIGS. 1, 2, 17 and 18, in step S300, the first nano controller nC1 may receive the plurality of job requests JREQA, JREQB, JREQC and JREQD from the CPU 20 (step S310). The first nano controller nC1 may allocate the plurality of target jobs corresponding to the respective job requests JREQA, JREQB, JREQC and JREQD to the first through n-th nano controllers nC1, . . . , nCn (step S320). For example, as described above with reference to FIG. 10, the first target job corresponding to the first job request JREQA may be allocated to the first nano controller nC1. The second target job corresponding to the second job request JREQB may be allocated to the second nano controller nC2. The third target job corresponding to the third job request JREQC may be allocated to the third nano controller nC3. The fourth target job corresponding to the fourth job request JREQD may be allocated to the fourth nano controller nC4.

The first through n-th nano controllers nC1, . . . , nCn may perform the target jobs based on a multi-thread scheme (step S330). For example, as described above with reference to FIG. 10, the first through fourth nano controllers nC1, nC2, nC3 and nC4 may perform the plurality of target jobs based on a multi-thread scheme THDA, THDB, THDC and THDD. In other words, the plurality of target jobs may be substantially simultaneously performed within a single process.

When the plurality of target jobs are completed, the CPU 20 may be notified that the plurality of target jobs have been completed (step S340). For example, as described above with reference to FIG. 10, when the plurality of target jobs are completed by the first through fourth nano controllers nC1, nC2, nC3 and nC4, the second through fourth nano controllers nC2, nC3 and nC4 may use the return instructions RTNB, RTNC and RTND to notify the first nano controller nC1 that the second, third and fourth target jobs have been completed. The first nano controller nC1 may use the return instructions RTNA, RTNB, RTNC and RTND to notify the CPU 20 that the first, second, third and fourth target jobs have been completed.

Figure 19:
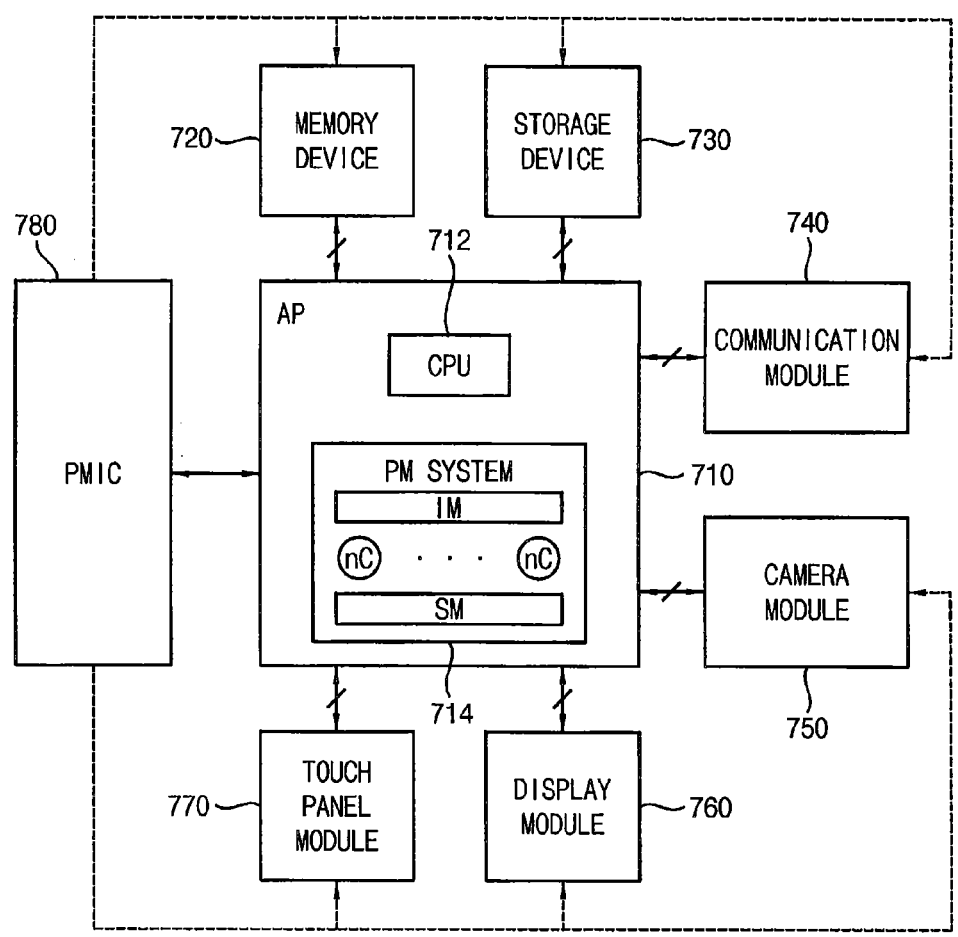
FIG. 19 is a block diagram illustrating a mobile device according to example embodiments.
Figure 20:
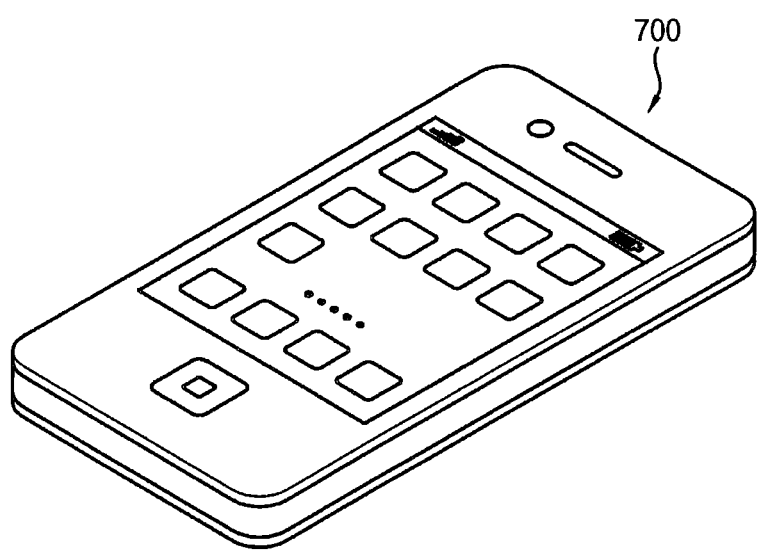
FIG. 20 is a diagram illustrating an example in which the mobile device of FIG. 19 is implemented as a smart-phone.

FIG. 19 is a block diagram illustrating a mobile device according to example embodiments. FIG. 20 is a schematic diagram illustrating an example in which the mobile device of FIG. 19 is implemented as a smart-phone.

Referring to FIGS. 19 and 20, a mobile device 700 includes a SoC 710 and a plurality of functional modules 740, 750, 760 and 770. The mobile device 700 may further include a memory device 720, a storage device 730 and a power management device 780. For example, as illustrated in FIG. 20, the mobile device 700 may be implemented as a smart-phone.

The SoC 710 controls overall operations of the mobile device 700. For example, the SoC 710 controls the memory device 720, the storage device 730 and the plurality of functional modules 740, 750, 760 and 770. The SoC 710 may be an application processor that is included in the mobile device 700.

The SoC 710 may be the SoC 10 in FIG. 1. For example, the SoC 710 includes a CPU 712 and a power management system 714. Although not illustrated in FIG. 19, the SoC 710 includes a plurality of functional blocks. The power management system 714 includes a plurality of programmable nano controllers nC. The nano controllers nC may be programmed to control power of the SoC 710. In addition, the nano controllers nC may operate based on relatively simple and limited instructions, and the instruction memory IM and the signal map memory SM may be shared by the nano controllers nC. Accordingly, the power management system 714 including the nano controllers nC may have a relatively simple structure and may efficiently reduce the power consumption of the SoC 710 and the mobile device 700.

The memory device 720 and the storage device 730 may store data for operations of the mobile device 700. The memory device 720 may include a volatile memory device, such as a dynamic random access memory (DRAM), a SRAM, a mobile DRAM, etc. The storage device 730 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 730 may further include a solid state drive (SSD), a hard disk drive (HDD), a CD-ROM, etc.

The functional modules 740, 750, 760 and 770 perform various functions of the mobile device 700. For example, the mobile device 700 may include a communication module 740 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for a microwave access (WIMAX) module, etc.), a camera module 750 that performs a camera function, a display module 760 that performs a display function, a touch panel module 770 that performs a touch sensing function, etc. In some example embodiments, the mobile device 700 may further include a global positioning system (GPS) module, a microphone (MIC) module, a speaker module, a gyroscope module, etc. However, the functional modules 740, 750, 760, and 770 in the mobile device 700 are not limited thereto.

The power management device 780 may provide an operating voltage to the SoC 710, the memory device 720, the storage device 730 and the functional modules 740, 750, 760 and 770.

Figure 21:
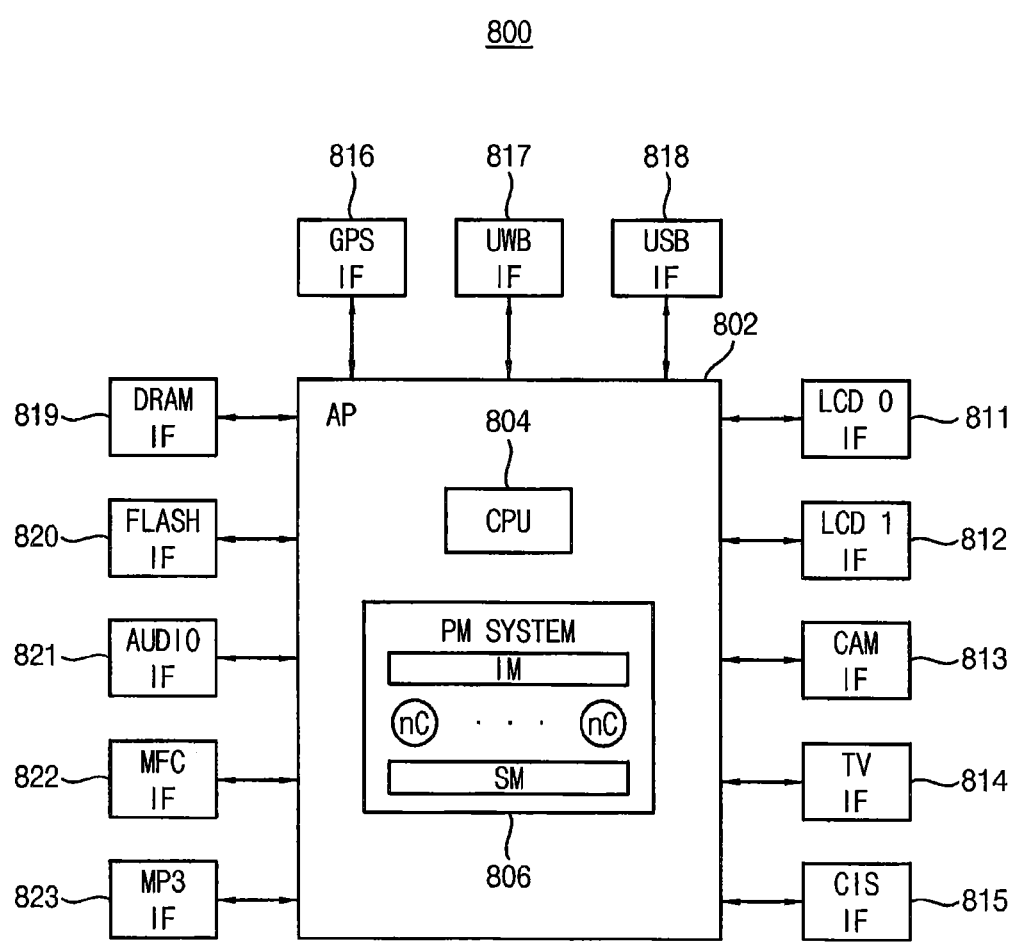
FIG. 21 is a block diagram illustrating an interface included in a mobile device according to example embodiments.

FIG. 21 is a block diagram illustrating an interface included in a mobile device according to example embodiments.

Referring to FIG. 21, a mobile device 800 includes a SoC 802 and a plurality of interfaces 811, 812, 813, 814, 815, 816, 817, 818, 819, 820, 821, 822 and 823. According to example embodiments, the mobile device 800 may be any mobile device, such as a mobile phone, a smart phone, a tablet computer, a laptop computer, a personal digital assistants (PDA), a portable multimedia player (PMP), a digital camera, a portable game console, a music player, a camcorder, a video player, a navigation system, etc.

The SoC 802 controls overall operations of the mobile device 800. For example, the SoC 802 may be an application processor that is included in the mobile device 800.

The SoC 802 may communicate with each of a plurality of peripheral devices (not illustrated) via each of the plurality of interfaces 811~823. For example, each of the interfaces 811~823 may transmit at least one control signal, which is output from a respective IP among a plurality of IPs implemented in each of power domains, to each of the plurality of peripheral devices.

For example, the SoC 802 may control a power state and an operation state of each flat panel display device via each of display interfaces 811 and 812. The flat panel display device may include a liquid crystal display (LCD), a light emitting diode (LED) display, an organic light emitting diode (OLED) display or an active matrix organic lightemitting diode (AMOLED) display, etc.

The SoC 802 may control a power state and an operation state of a camcorder via a camcorder interface 813, may control a power state and an operation state of a TV module via a TV interface 814, and may control a power state and an operation state of a camera module or an image sensor module via an image sensor interface 815.

The SoC 802 may control a power state and an operation state of a GPS module via a GPS interface 816, may control a power state and an operation state of a UWB module via a UWB interface 817, and may control a power state and an operation state of an universal serial bus (USB) drive via a USB drive interface 818.

The SoC 802 may control a power state and an operation state of a DRAM via a DRAM interface 819, may control a power state and an operation state of a nonvolatile memory device (e.g., a flash memory) via a nonvolatile memory interface 820 (e.g., a flash memory interface), may control a power state and an operation state of an audio module through an audio interface 821, may control a power state of a multi-format codec (MFC) through an MFC interface 822, and may control a power state of an MP3 player through an MP3 player interface 823. For example, a module or an interface may be implemented in hardware or software.

The SoC 802 may be the SoC 10 in FIG. 1. For example, the SoC 802 includes a CPU 804 and a power management system 806. Although not illustrated in FIG. 21, the SoC 802 includes a plurality of functional blocks. The power management system 806 includes a plurality of programmable nano controllers nC. The nano controllers nC may be programmed to control power of the SoC 802. In addition, the nano controllers nC may operate based on relatively simple and limited instructions, and the instruction memory IM and the signal map memory SM may be shared by the nano controllers nC. Accordingly, the power management system 806 including the nano controllers nC may have a relatively simple structure and may efficiently reduce the power consumption of the SoC 802 and the mobile device 800.

Figure 22:
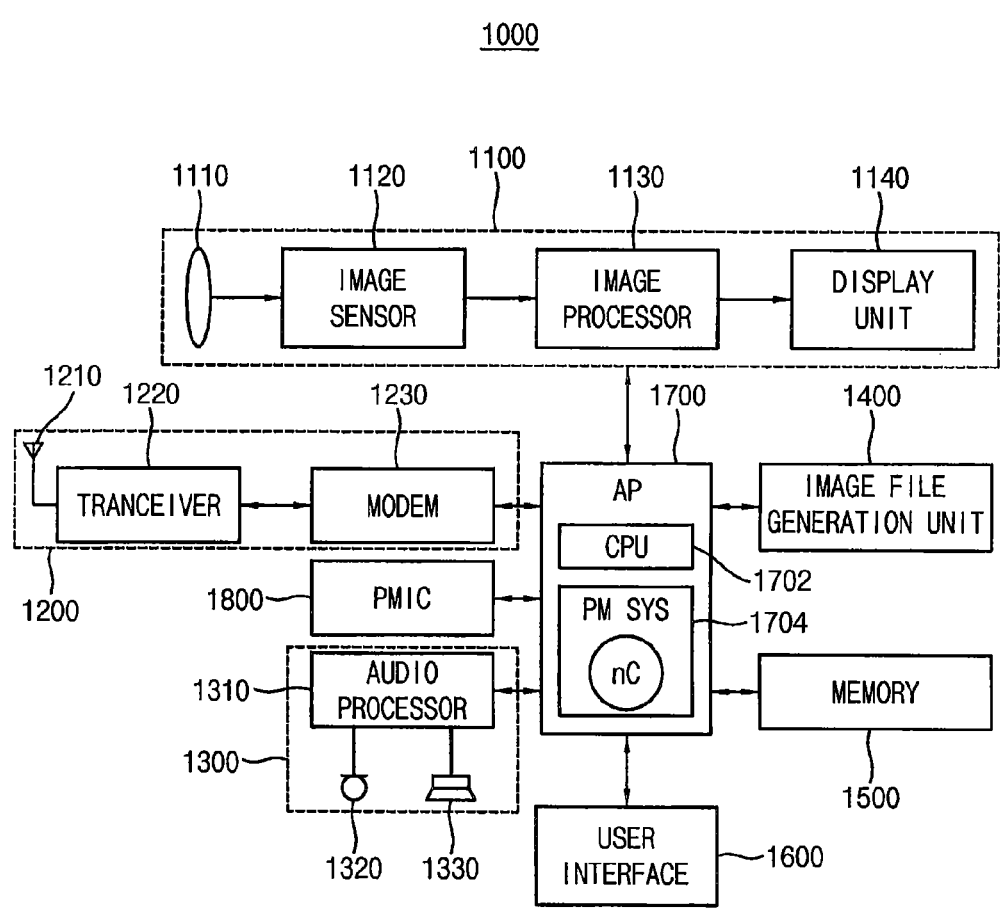
FIG. 22 is a block diagram illustrating a portable terminal according to example embodiments.

FIG. 22 is a block diagram illustrating a portable terminal according to example embodiments.

Referring to FIG. 22, a portable terminal 1000 includes an image processing block 1100, a wireless transceiving block 1200, an audio processing block 1300, an image file generation unit 1400, a memory device 1500, a user interface 1600, an application processor 1700 and a power management device 1800.

The image processing block 1100 may include a lens 1110, an image sensor 1120, an image processor 1130 and a display unit 1140. The wireless transceiving block 1200 may include an antenna 1210, a transceiver 1220 and a modem 1230. The audio processing block 1300 may include an audio processor 1310, a microphone 1320 and a speaker 1330.

The portable terminal 1000 may include various kinds of semiconductor devices. The application processor 1700 may require low power consumption and high performance. The application processor 1700 may include multiple cores. The application processor 1700 may be the SoC 10 in FIG. 1. For example, the application processor 1700 includes a CPU 1702 and a power management system 1704. Although not illustrated in FIG. 22, the application processor 1700 includes a plurality of functional blocks. The power management system 1704 includes a plurality of programmable nano controllers nC. The nano controllers nC may be programmed to control power of the application processor 1700. In addition, the nano controllers nC may operate based on relatively simple and limited instructions, and the instruction memory IM and the signal map memory SM may be shared by the nano controllers nC. Accordingly, the power management system 1704 including the nano controllers nC may have a relatively simple structure and may efficiently reduce the power consumption of the application processor 1700 and the portable terminal 1000.

The power management device 1800 may provide an operating voltage to the image processing block 1100, the wireless transceiving block 1200, the audio processing block 1300, the image file generation unit 1400, the memory device 1500, the user interface 1600 and the application processor 1700.

The devices disclosed herein may be used in various kinds of SoCs or a system including the SoCs, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of example embodiments and is not to be construed as limiting thereof. Although a few example embodiments have been described, those skilled in the art will readily appreciate that many modifications are possible to the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A power management system for controlling power to a plurality of functional blocks included in a system-on-chip, the power management system comprising:
    a plurality of nano controllers including first through n-th nano controllers that are programmable nano controllers, where n is a natural number that is greater than or equal to two;
    an instruction memory that is shared by the plurality of nano controllers, the instruction memory including a plurality of instructions stored therein that are used by the plurality of nano controllers; and
    a signal map memory that is shared by the plurality of nano controllers, the signal map memory configured to store a plurality of signals that are provided to the plurality of functional blocks under the control of one or more of the plurality of nano controllers,
    wherein the first nano controller is programmed as a central sequencer, and the second through n-th nano controllers are programmed as first sub-sequencers that are dependent on the first nano controller.

2. The power management system of claim 1, wherein each of the plurality of nano controllers includes:
    an instruction address generator that is configured to generate a target instruction address based on a job request;
    an instruction register that is configured to fetch a target instruction that is included in the plurality of instructions based on the target instruction address;
    an instruction decoder that is configured to decode the target instruction; and an instruction execution unit that is configured to execute the target instruction.

3. The power management system of claim 2, wherein the job request includes the target instruction address, and the instruction address generator includes a program counter that is configured to store and output the target instruction address.

4. The power management system of claim 2, wherein the job request includes a job command, and the instruction address generator includes:
 a command decoder that is configured to decode the job command to generate the target instruction address; and
 a program counter that is configured to store and output the target instruction address.

5. The power management system of claim 2, wherein the first nano controller further includes a job allocation state register that is configured to store present job states of each of the plurality of nano controllers.

6. The power management system of claim 1, wherein the first nano controller is configured to allocate a first target job that corresponds to a first job request to one of the first through n-th nano controllers in response to receiving the first job request from an external device.

7. The power management system of claim 6, wherein the first nano controller is configured to allocate the first target job to the first nano controller if the first nano controller is in an idle state when the first job request is processed, and
 wherein the first nano controller is configured to allocate the first target job to one of the second through n-th nano controllers if a second target job that is different from the first target job is allocated to the first nano controller when the first job request is processed.

8. The power management system of claim 7, wherein the first nano controller is configured to allocate the first target job to the second nano controller by calling the second nano controller based on a call instruction included in the plurality of instructions and an identification (ID) of the second nano controller, and by providing the first job request to the second nano controller,
 wherein the second nano controller is configured to notify the first nano controller that the first target job is completed using a return instruction that is included in the plurality of instructions.

9. The power management system of claim 1, wherein the first through n-th nano controllers are configured to perform a plurality of target jobs that correspond to a plurality of job requests that are received by the first nano controller from an external device based on a multi-thread scheme.

10. The power management system of claim 1, wherein the plurality of nano controllers further includes (n+1)-th through m-th nano controllers that are programmed as second sub-sequencers that are dependent on the second nano controller, where m is a natural number equal to or greater than (n+1).

11. The power management system of claim 1, wherein a respective one of the second through n-th nano controllers are configured to control the power for a respective one of the plurality of functional blocks.

12. The power management system of claim 1, wherein the plurality of signals include reset signals, power supply voltages and data retention control signals,
 wherein a respective one of the second through n-th nano controllers are configured to control a respective one of a group of the reset signals, a group of the power supply voltages and a group of the data retention control signals.

13. The power management system of claim 1, wherein the plurality of nano controllers are configured to operate based on an asynchronous interface using a request instruction and an acknowledgement instruction.

14. The power management system of claim 1, wherein the plurality of instructions includes a flow control instruction, a loading instruction, a storing instruction, a request instruction, an acknowledgement instruction, a call instruction, a return instruction, a wait instruction and a move instruction.

15. The power management system of claim 1 in combination with the system-on-chip, the system-on-chip further comprising a central processing unit that is configured to control the plurality of functional blocks and the power management system.

16. The power management system of claim 15 in combination with a mobile device that includes a plurality of functional modules that are configured to be controlled by the system-on-chip.

17. A method of controlling power delivered to a plurality of functional blocks of a system-on-chip, the method comprising:
 designating a first of a plurality of programmable nano controllers as a central sequencer;
 designating additional of the plurality of programmable nano controllers as first sub-sequencers that are dependent on the first of the plurality of programmable nano controllers;
 receiving a first job request;
 allocating, by the first of the plurality of nano controllers, a first target job corresponding to the first job request to one of the plurality of programmable nano controllers based at least in part on a present job state of one or more of the plurality of programmable nano controllers; and
 performing the first target job at the allocated one of the plurality of programmable nano controllers using a first instruction that is fetched from an instruction memory that is shared by the plurality of programmable nano controllers.

18. The method of claim 17, wherein performing the first target job at the allocated one of the plurality of programmable nano controllers using the first instruction that is fetched from an instruction memory that is shared by the plurality of programmable nano controllers comprises:
 using an address for the first instruction to fetch the first instruction from the instruction memory;
 decoding the first instruction at the allocated one of the plurality of programmable nano controllers; and
 executing the first instruction at the allocated one of the plurality programmable nano controllers.

19. The method of claim 17, wherein allocating a first target job corresponding to the first job request to one of the plurality of programmable nano controllers based at least in part on a present job state of one or more of the plurality of programmable nano controllers comprises allocating the first target job request to the first of the plurality of nano controllers if the first of the plurality of nano controllers is in an idle state.

20. The method of claim 17, wherein allocating a first target job corresponding to the first job request to one of the plurality of programmable nano controllers based at least in part on a present job state of one or more of the plurality of programmable nano controllers comprises allocating the first target job request to a second of the plurality of nano controllers if a second target job that is different from the first target job is presently allocated to the first of the plurality of nano controllers.

* * * * *